June 18, 1963 R. E. EVANS 3,094,208

RECORD FOLDER

Filed Sept. 25, 1961

INVENTOR:
Richard E. Evans,
BY Bair, Freeman & Molinare
ATTORNEYS.

United States Patent Office 3,094,208
Patented June 18, 1963

3,094,208

RECORD FOLDER

Richard E. Evans, % American Evatype Corp., 750 Central Ave., Deerfield, Ill.
Filed Sept. 25, 1961, Ser. No. 140,353
2 Claims. (Cl. 206—62)

This invention relates to record folders and more particularly to a permanent folder for enclosing a thin plastic phonograph record and to support the record while it is being played.

Many different types of recordings are presently being made on thin plastic film or sheets. These films or sheets are so light and thin that it is desirable to provide a folder of paperboard, or the like, to protect them during handling and to support them on a phonograph turntable during playing.

One of the problems in providing such folders and particularly folders for single records is connecting the cover sheets and the record so that they will all lie flat in both the closed condition of the folder and in its opened playing position. Conventional types. of hinge structures either are too expensive for single record folders or tend to cause the cover sheets and the record to bow upwardly when the folder is opened to its playing position so that the record is not flat on the turntable and will not play properly.

It is accordingly one of the objects of the present invention to provide a record folder in which the record and cover sheets are so connected that they will lie flat in either the closed or opened position of the folder.

Another object is to provide a record folder in which the cover and record sheets are hingedly connected by a strip of adhesive tape which may easily be applied to the sheets and which serves as a flexible hinge connection therebetween.

The above and other objects and features of the invention will be more readily apparent from the following description when read in connection with the accompanying drawing, in which.

Figures 1, 2, 3, 4, 5, 6:
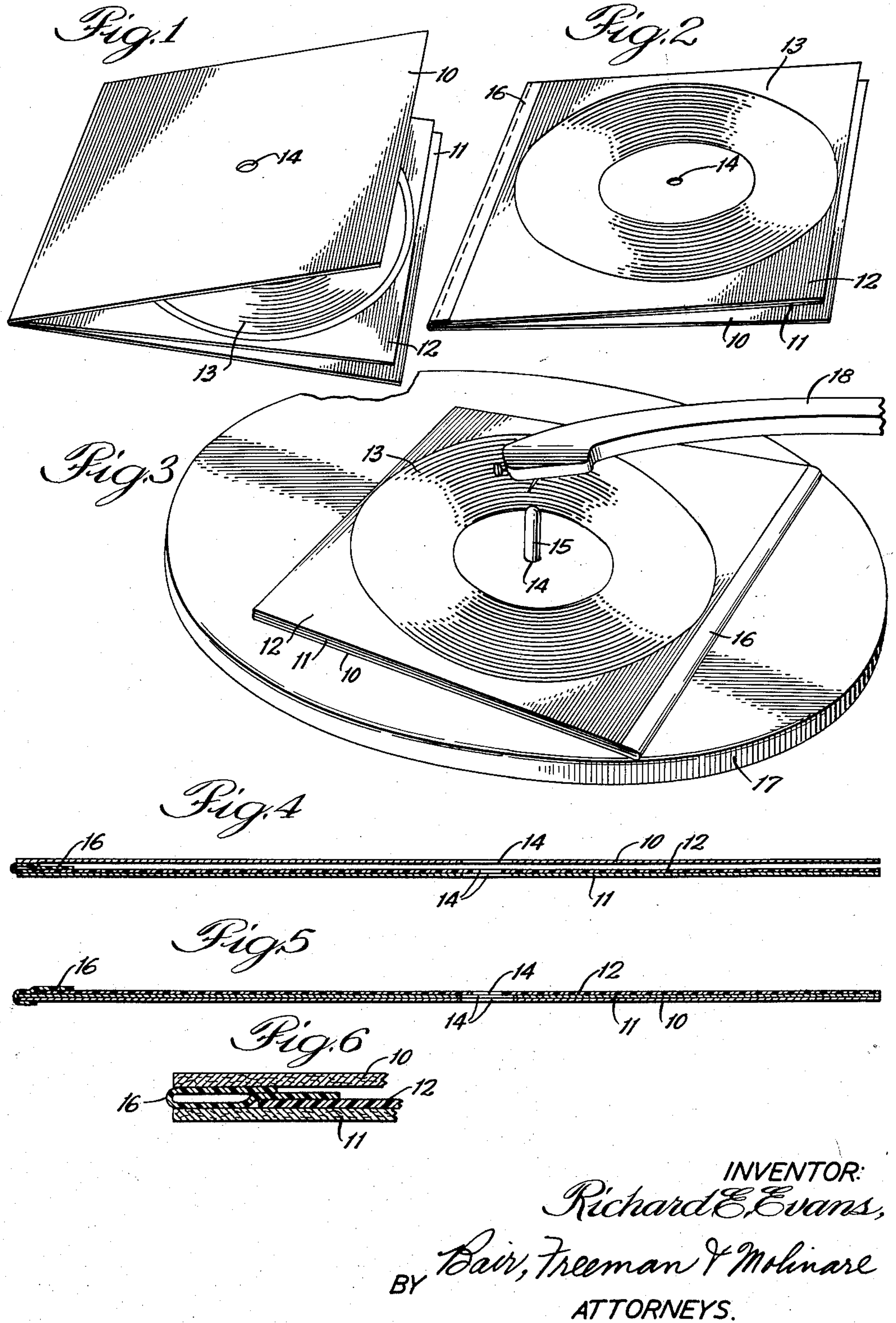
FIGURE 1 is a perspective view of a record folder embodying the invention in a partially opened condition.
FIGURE 2 is a similar view showing the folder in its fully open position for playing.
FIGURE 3 is a view of the open folder placed on a phonograph tunrntable.
FIGURES 4 and 5 are sectional views showing the folder, respectively, in its closed and opened positions.
FIGURE 6 is a partial enlarged section similar to FIGURE 4.

The record folder, as shown, is made up of three rectangular sheets, although it will be apparent that the shape of the sheets could be varied as desired. The folder comprises a top cover sheet 10 and a bottom cover sheet 11, both of which are preferably formed of paperboard or similar material having the weight and thickness necessary properly to protect and support the record. The record sheet 12 is of relatively thin plastic material having a sound track 13 impressed in one surface thereof. The sheets are concentrically punched with openings 14 which align in both the closed and opened positions of the cover with the opening in the record sheet being of a size to fit closely over the spindle of a turntable, as shown at 15 in FIGURE 3. Preferably the openings in the cover sheets are larger than the opening in the record sheet, as illustrated in FIGURES 4 and 5, so that extreme accuracy of alignment of the cover and record sheets is not required.

The cover and record sheets are hingedly connected together by a strip of flexible tape 16, as best seen in FIGURES 4 to 6. As will be noted from these figures, the record sheet 12 is shorter in one dimension than the cover sheets, although in its other dimension it may be and preferably is of the same size. When the sheets are pressed together therefore with the edges aligned at three sides, the record sheet will terminate short of the edges of the cover sheets. The tape 16, which may be in the form of a continuous strip as shown or in two or more separate pieces of any desired shape, is applied to the edge portions of the sheets so that at one side it partially overlies the edge of the record sheet and overlies the edge portion of the bottom cover in the space between its extreme edge and the edge of the record sheet. In the closed condition of the folder the tape is bent back upon itself to engage the edge portion of the top cover sheet, as shown. It will be noted that with the tape assembled in this manner there is a short loop of tape at the edge of the assembly providing sufficient freedom so that the top cover sheet can be folded over flat against the bottom of the bottom cover sheet without straining the tape or producing any tendency to bow the cover sheets. The tape is coated with an adhesive, preferably of the pressure sensitive type, to adhere to the areas of the cover and record sheets which it engages.

FIGURES 4 and 6 illustrate the condition of the several sheets when the cover is closed. The tape 16 flexes along the edges of the sheets, as shown in FIGURES 4 and 6, so that the top cover sheet can lie flat against the record sheet which in turn will lie flat against the bottom cover sheet. To open the folder for playing, the top cover sheet is folded back to underlie the bottom cover sheet, as shown in FIGURE 5. Because of the free portion of the tape at the hinge connection, the top cover sheet can fold flat against the lower surface of the bottom cover sheet without producing any pull on the cover or record sheets which would tend to bow them upwardly and to interfere with proper playing of the record.

With the folder in its opened condition, as shown in FIGURE 5, the entire folder may be placed on a turntable, as illustrated at 17, with the spindle thereof fitting relatively closely through the opening 14 in the record sheet to guide it concentrically with the turntable. The sound track 13 is, of course, concentric with the opening 14 in the record sheet so that the needle carried by the tone arm 18 of a record player will accurately follow the sound track 13 as the record is played.

The present construction can be assembled very simply and inexpensively simply by securing the tape over the edges of the cover and record sheets while they are in the position shown in FIGURE 5 so that the proper amount of free space will be provided in the tape to permit free folding of the sheets to their opened position. When the record is being played, the cover sheets reinforce and support it so that it will be held properly on the turntable and will not tend to slide thereon.

While one embodiment of the invention has been shown and described herein, it will be understood that it is illustrative only and not to be taken as a definition of the scope of the invetnion, reference being had for this purpose to the appended claims.

What is claimed is:

1. A record folder comprising separate top and bottom cover sheets registering along a straight edge of each, a record sheet overlying the bottom cover sheet and having a straight edge spaced inward from said straight edge of the bottom cover sheet, and a strip of flexible tape having one edge portion overlying and adhesively secured to the face of the record sheet adjacent to said straight edge thereof, an intermediate portion overlying and adhesively secured to the inner face of the bottom cover sheet between the straight edge thereof and the straight edge of the record sheet and its other edge portion folded back and adhesively secured to the inner face of the top cover sheet adjacent to the straight edge thereof.

2. A record folder comprising separate rectangular paperboard top and bottom cover sheets of the same size, a rectangular plastic record sheet between the cover sheets shorter in one direction than the cover sheets so that one edge thereof is spaced from one edge of the cover sheets, and a flexible strip having one edge portion overlying and secured to the face of the record sheet adjacent to said one edge thereof, an intermediate portion overlying and secured to the inner face of the bottom cover sheet between said one edge thereof and said one edge of the record sheet and its other edge portion folded over upon itself and secured to the inner face of the top cover sheet adjacent to said one edge thereof.

References Cited in the file of this patent

UNITED STATES PATENTS

| | | |
|---|---|---|
| 1,963,552 | Horwitt | June 17, 1934 |
| 2,225,048 | Hasin | Dec. 17, 1940 |
| 2,306,726 | Hasin | Dec. 29, 1942 |

FOREIGN PATENTS

| | | |
|---|---|---|
| 1,166,839 | France | Nov. 17, 1958 |